(12) United States Patent
Inaba

(10) Patent No.: US 6,434,872 B1
(45) Date of Patent: *Aug. 20, 2002

(54) SLIDE MOUNT

(76) Inventor: Minoru Inaba, No. 1116, Oaza Samukawa, Oyama-shi, Tochigi-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 08/693,614

(22) Filed: Aug. 7, 1996

Related U.S. Application Data

(62) Division of application No. 08/275,990, filed on Jul. 15, 1994.

(30) Foreign Application Priority Data

Apr. 28, 1994 (JP) .............................................. 6-092635

(51) Int. Cl.⁷ .............................................. G03C 1/765
(52) U.S. Cl. .......................................... 40/706; 40/707
(58) Field of Search .................................... 40/706, 707

(56) References Cited

U.S. PATENT DOCUMENTS

| | | | | |
|---|---|---|---|---|
| 2,184,007 A | * | 12/1939 | Staehle ........................ | 40/701 |
| 2,527,765 A | * | 10/1950 | Roehrl ........................ | 40/706 |
| 2,823,478 A | | 2/1958 | Ostergaard et al. ......... | 400/706 |
| 3,235,991 A | | 2/1966 | Harper et al. ................. | 40/706 |
| 3,973,344 A | | 8/1976 | Frankel | |
| 5,392,548 A | | 2/1995 | Truc et al. .................... | 40/706 |
| 5,447,828 A | * | 9/1995 | Inaba ......................... | 430/496 |

FOREIGN PATENT DOCUMENTS

| | | |
|---|---|---|
| CA | 685004 | 4/1964 |
| EP | 41211 | 12/1981 |
| GB | 2039329 | 8/1982 |

* cited by examiner

*Primary Examiner*—Cassandra H. Davis
(74) *Attorney, Agent, or Firm*—Fattibene & Fattibene; Paul A. Fattibene; Arthur T. Fattibene

(57) ABSTRACT

A film cut into a screen is correctly and easily fitted onto a slide mount. For this purpose, the slide mount is formed by joining a mount and a cover together, and windows are opened in the central portions of the mount and the cover, respectively. A film-placing portion is provided surrounding the window of the mount, and positioning pins are studded at four corners of the film-placing portion so as to be corresponded to engaging holes at both side portions of the film. Positioning holes are perforated in the periphery of the window of the cover at positions opposed to the positioning pins. The film is placed on the film-placing portion, and the positioning holes of the cover are brought into engagement with the positioning pins of the mount while the cover is being depressed onto the film. Then, the engaging holes of the film engage with the positioning pins, and the film is correctly fitted onto the slide mount.

5 Claims, 6 Drawing Sheets

SLIDE MOUNT

This application is a division, of application Ser. No. 08/275,990, filed Jul. 15, 1994.

BACKGROUND OF THE INVENTION

The present invention relates to a slide mount and, particularly, to a slide mount onto which can be correctly fitted a film that is cut into individual screens.

DESCRIPTION OF THE PRIOR ART

A conventional slide mount will be described with reference to FIG. 6 wherein reference numeral 1 denotes a slide mount which is made of, for example, a plastic material. The slide mount 1 is constituted by a mount 2 and a cover 3, and the mount 2 is provided with a film-placing portion 4 which has a size nearly equal to that of a screen and further has a step with respect to the surface of the mount 2. At the center of the film-placing portion is opened a window 5. Furthermore, recessed portions 6, are formed in the periphery of the film-placing portion 4, and the outer peripheries of the recessed portions 6, are formed in a protruding manner. A window 7 is formed in the cover 3, and protruded portions 8, are provided on the periphery of the window 7. By fitting the protruded portions 8, into the recessed portions 6, of the mount 2, the mount 2 and the cover 3 are firmly fitted together; i.e., the window 5 and the window 7 are superposed one upon the other to form the slide mount 1.

The film 9 that is cut into a unit of screen is placed on the film-placing portion 4 and, then, the mount 2 and the cover 3 are fitted together so that the film 9 is fitted onto the slide mount 1.

In the conventional slide mount, the size of the film-placing portion in the direction of width is set to be in agreement with a specified value of the commercially available film, i.e., 35 mm. Therefore, the film that is cut into a screen is correctly placed in position in the direction of width thereof due to the step formed in the film-placing portion and the outer peripheries of the recessed portions. On the other hand, the film is cut by hand along the gap portions among the screens by using a pair of scissors. It is therefore difficult to cut the film into a predetermined size in the lengthwise direction thereof. Therefore, the film-placing portion in the lengthwise direction thereof has been set to a size which is larger than the size of a screen. Accordingly, the film that is inserted in the slide mount has a margin in the lengthwise direction and may undergo a deviation in position.

Moreover, if the window in the slide mount has a size equal to the size of the screen of the film, then, the end of the film becomes in short of contact with the window when the size of the film is short in the lengthwise direction thereof, causing light to leak. If the size of the window is selected to be smaller than the size of the screen in order to solve the above defect, on the other hand, there arouses another problem in that the window and the end of the screen are superposed causing the screen to be partly missing.

Thus, there arouses a technical problem in regard to correctly and easily fitting a screen of film onto the slide mount without causing the screen to be missing. The object of the present invention is to solve this problem.

SUMMARY OF THE INVENTION

The present invention was proposed in order to achieve the above object, and provides a slide mount for projecting a slide film one screen by one screen by using a slide device, wherein said slide mount is constituted by a mount and a cover, windows are formed at the central portions of the mount and the cover, respectively, a film-placing portion is formed surrounding the window of the mount, positioning pins are studded at four corners of said film-placing portion so as to be corresponded to engaging holes in both side portions of the film, positioning holes are perforated at positions opposed to said positioning pins, and the positioning holes are fitted to the positioning pins, so that the mount and the cover are fitted together, and further provides a slide mount in which the windows formed in said mount and in said cover are larger than the size of the screen of said film.

According to the invention, windows are formed at the central portions of the mount and the cover, respectively, and the film-placing portion is formed surrounding the window of the mount. Here, the film to be fitted onto the slide mount has holes perforated in both side portions thereof in an opposing manner maintaining an equal distance. A photograph is taken in a manner that the pairs of holes come into agreement with gap portions among the screens, and the gap portions at both ends of the screen of the film are cut; i.e., pairs of holes are cut starting from the central portions thereof, and engaging holes are formed at both ends of the film.

The film-placing portion of the mount is disposed being upwardly faced and the film cut into a screen is placed on the film-placing portion. Then, the film is placed with its central portion being curved in a convexed manner and with its both end portions being in contact with the film-placing portion. The film is then downwardly pushed by bringing the cover into contact therewith from the upper direction. The convexed central portion of the film is pressed onto the film-placing portion and is further extended in the lengthwise direction, so that engaging holes at both end portions of the film come into engagement with the positioning pins. Then, by bringing the positioning holes in the cover into engagement with the positioning pins, the film is correctly fitted onto the slide mount.

According to the invention of, the windows formed in the mount and in the cover have a size larger than the size of the screen of the film and, besides, the screen of the film is correctly disposed at the same position of the slide mount. Therefore, the screen of the film is fitted inside the windows without being superposed on the windows.

BRIEF DESCRIPTION OF THE DRAWINGS

FIG. 1 illustrates an embodiment of the present invention, wherein

DETAILED DESCRIPTION OF PREFERRED EMBODIMENTS

Figure 1A:
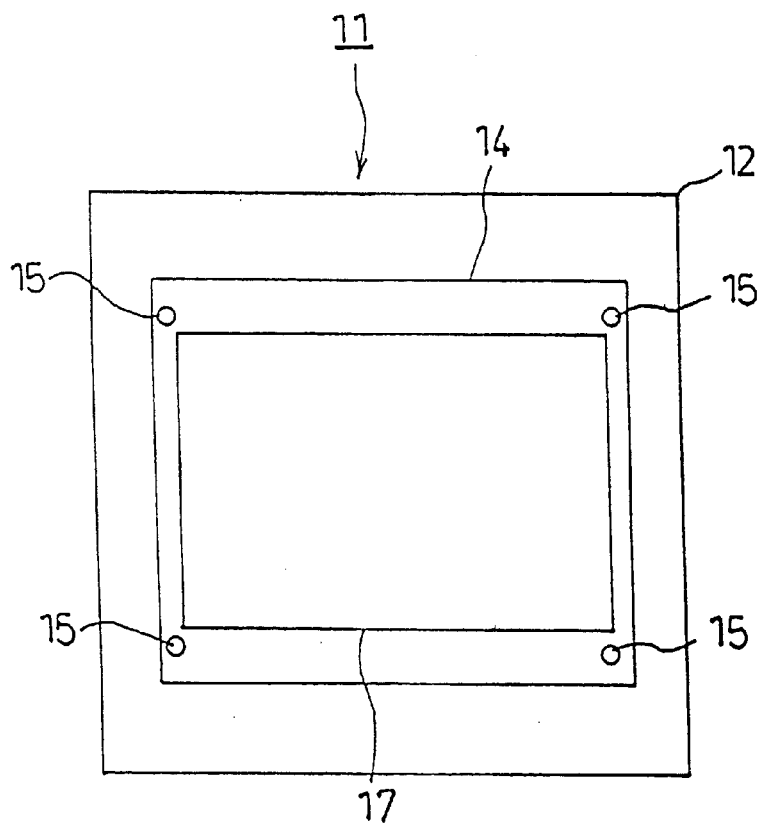
FIG. 1(A) is a plan view of a mount and FIG. 1(B) is a plan view of a cover.
Figure 1B:
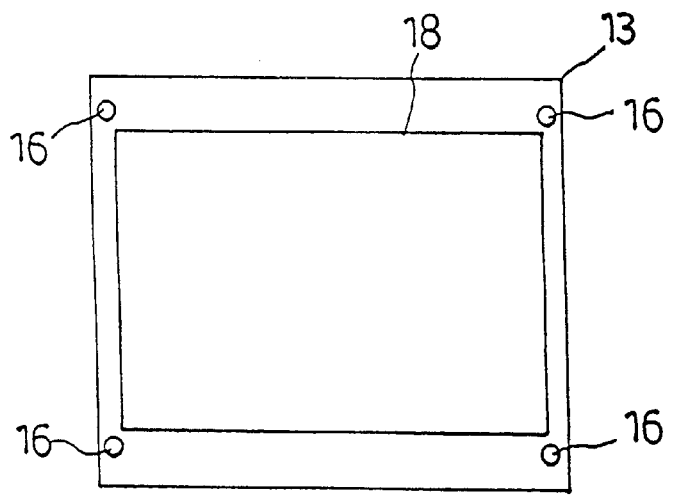

An embodiment of the present invention will now be described in detail with reference to FIGS. 1 to 5. FIGS. 1(A) and 1(B) illustrate a slide mount 11 which is constituted by a mount 12 and a cover 13. Referring to FIG. 1(A), a film-placing portion 14 is formed at the center of the mount 12, and is forming a step which is equal to, or deeper than, the sum of the thickness of the film and the thickness of the cover 13 from the surface of the mount 12. Positioning pins 15, are studded at four corners of the film-placing portion 14, i.e., at positions corresponding to engaging holes in both side portions of the film that will be described later. As shown in FIG. 1(B) furthermore, positioning holes 16, are perforated in the cover 13 at positions where they will be brought into engagement with the positioning pins 15. Moreover, windows 17 and 18 are opened in the mount 12 and in the cover 13, the windows 17 and 18 being arranged on the inside of the positioning pins 15, and the positioning holes 16.

Figure 2:
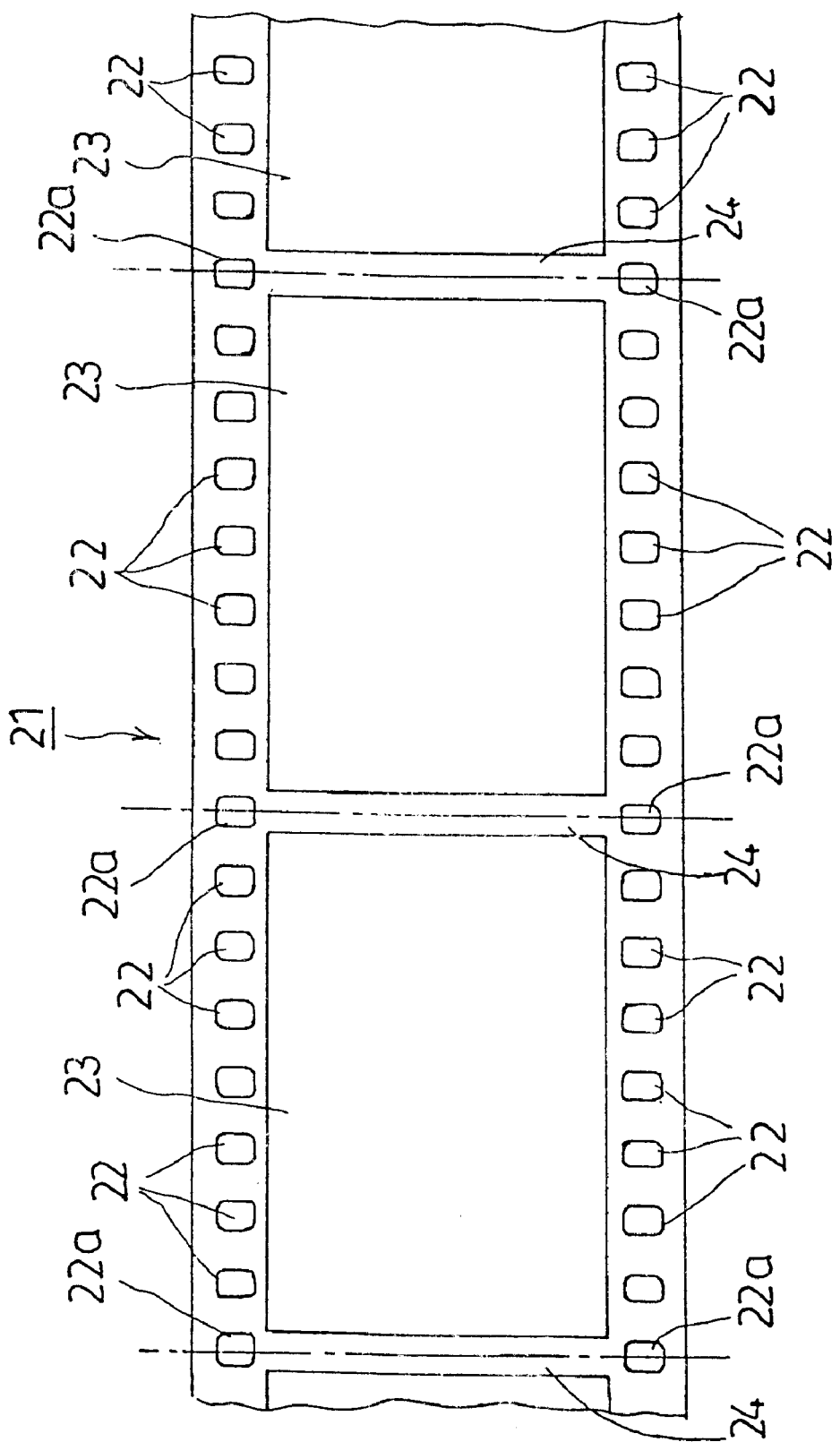
FIG. 2 is a plan view showing the shape of a film.

FIG. 2 illustrates a film 21 which is obtained by developing a positive film for slide. The film 21 has a width of 35 mm, and holes 22, are perforated in an opposing manner in the side portions of the film 21.

In the film 21 are photographed screens 23, which are isolated in the lengthwise direction by gap portions 24. The gap portions 24, have been set in advance at the time of taking photographs so as to be positioned between the holes 22a, that are formed in an opposing manner. Therefore, the center lines of the gap portions 24, are in agreement with lines connecting the centers of the holes 22a.

Figure 3:
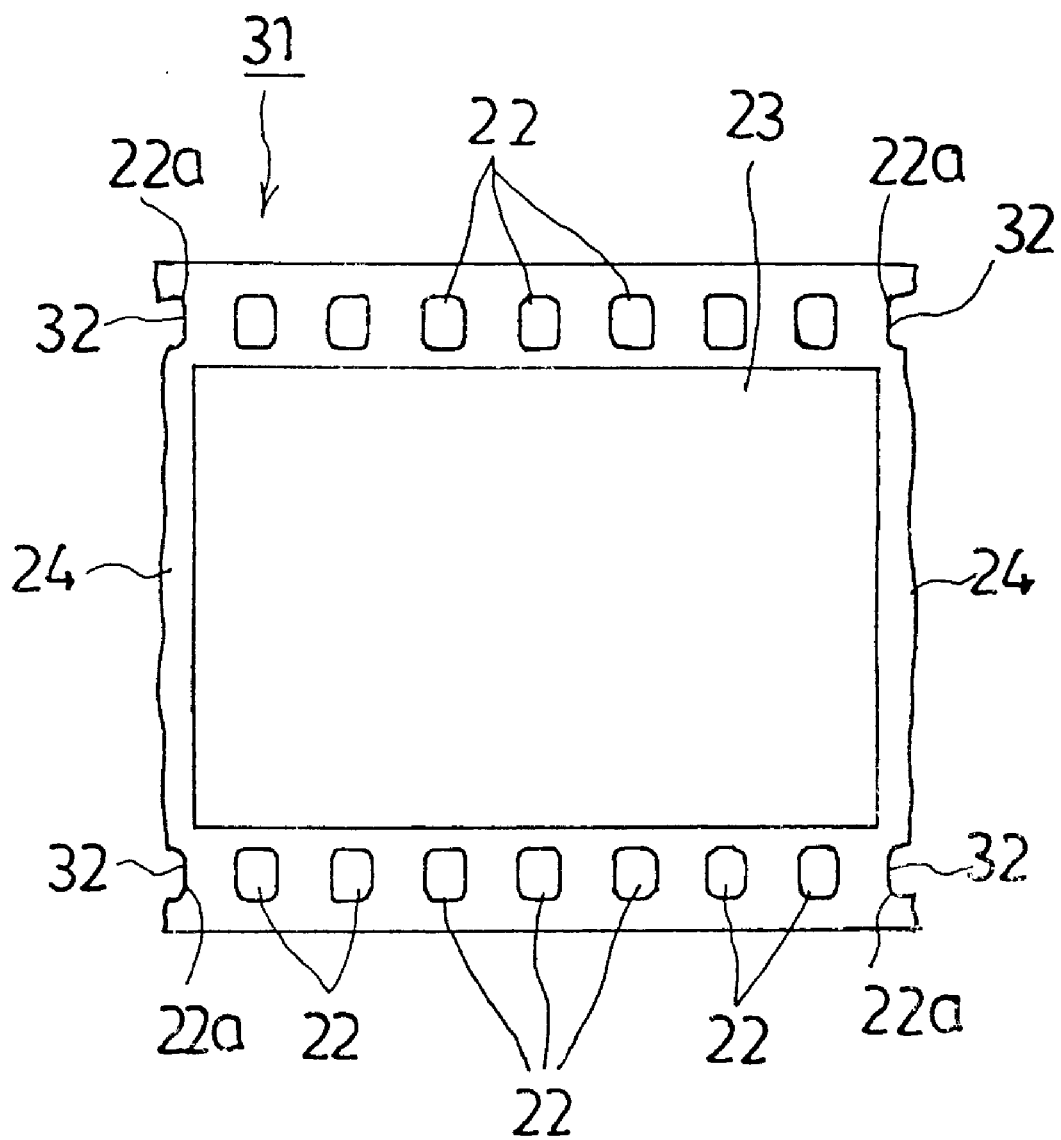
FIG. 3 is a plan view showing the shape of the film cut into a screen.

By cutting the gap portions 24, at both ends of the screen 23 of the film 21 and cutting the holes 22a, in both side portions using a pair of scissors or the like, there is formed a film 31 that is shown in FIG. 3. With the holes 22a, being cut nearly into one-half at the ends on both sides of the film 31, there are now formed engaging holes 32. Since the film 31 is a positive film that is developed, the unexposed portions surrounding the screen 23 remain black and shut off the light.

Figure 4:
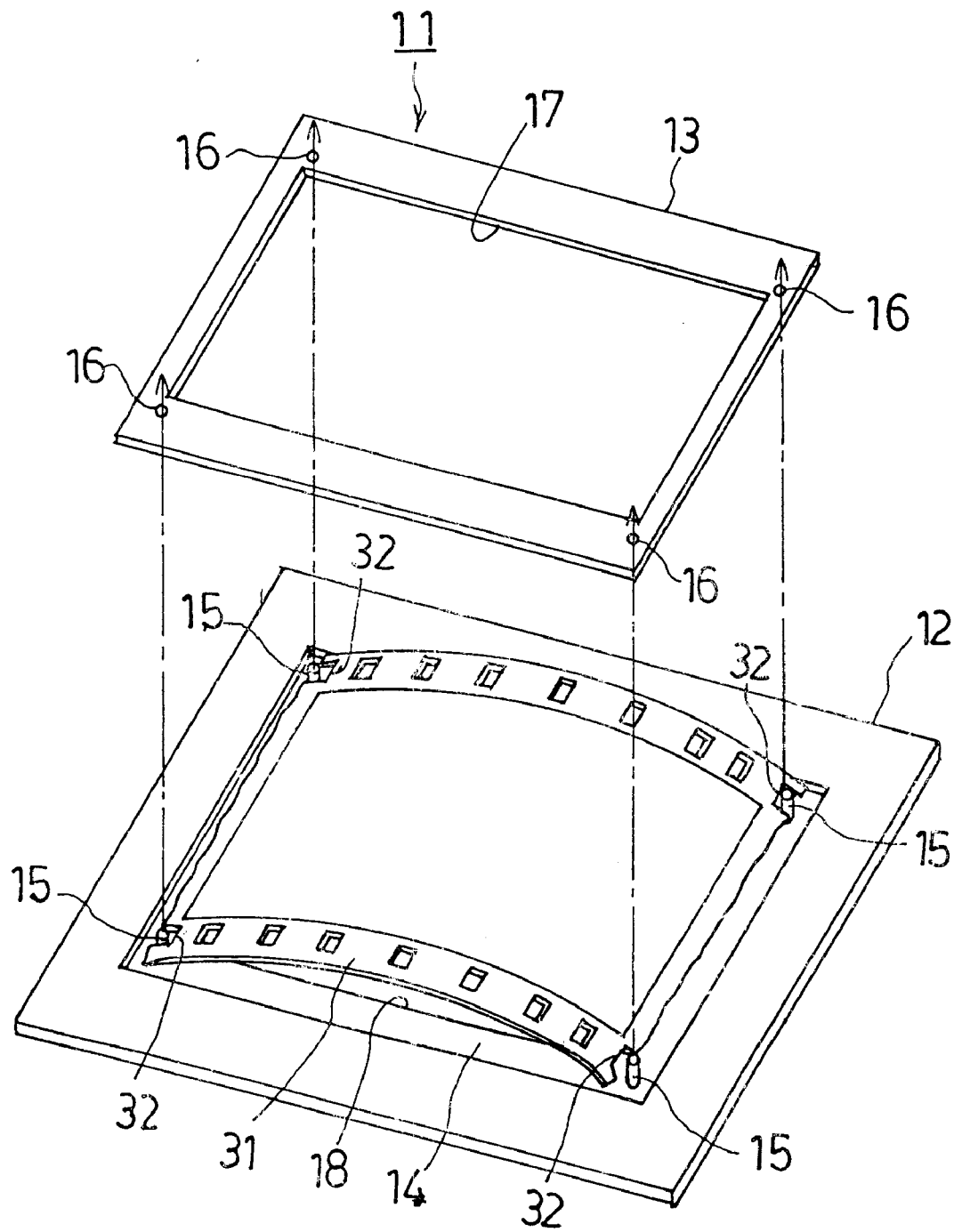
FIG. 4 is a perspective view illustrating the state where the film is b eing fitted onto a slide mount.

To fit the film 31 onto the slide mount 11, therefore, the film 31 is first placed on the film-placing portion 14 of the mount 12 as shown in FIG. 4. Then, the engaging holes 32, formed in both end portions of the film 31 are arranged at positions where they come into engagement with the positioning pins 15. In this case, the film is curved in both the lengthwise direction and in the widthwise direction with the surface of the emulsified material being faced inwards. That is, the film 31 is placed on the film-placing portion 14 with its central portion being curved in a convexed manner. Then, the cover 13 that is maintained horizontal is placed over the mount 12 and is downwardly moved toward the mount 12 from the upper direction; i.e., the cover 13 comes into contact with the surface of the convexed portion of the film 31.

The cover is further downwardly urged so as to depress the film 31. The back surface of the convexed portion of the film 31 then comes into contact with the film-placing portion 14, and the film 31 is extended in the horizontal direction. The positioning holes 16, of the cover 13 are then brought into engagement with the positioning pins 15. Here, the engaging holes 32, at both ends of the film 31 engage with the positioning pins 15, and thus the film 31 engages with the positioning pins 15.

Figure 5:
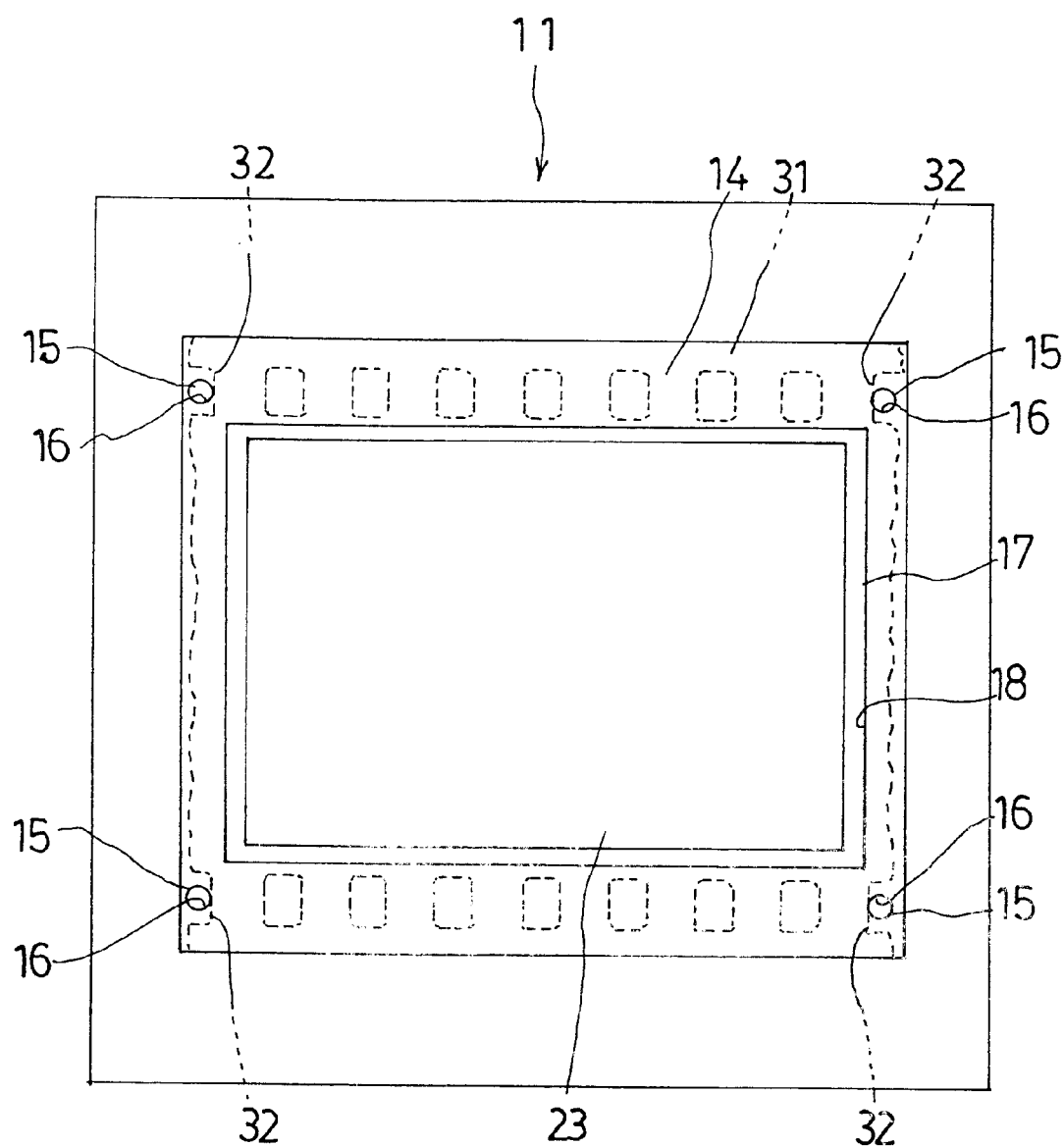
FIG. 5 is a plan view illustrating the state where the film is fitted onto the slide mount.
Figure 6:
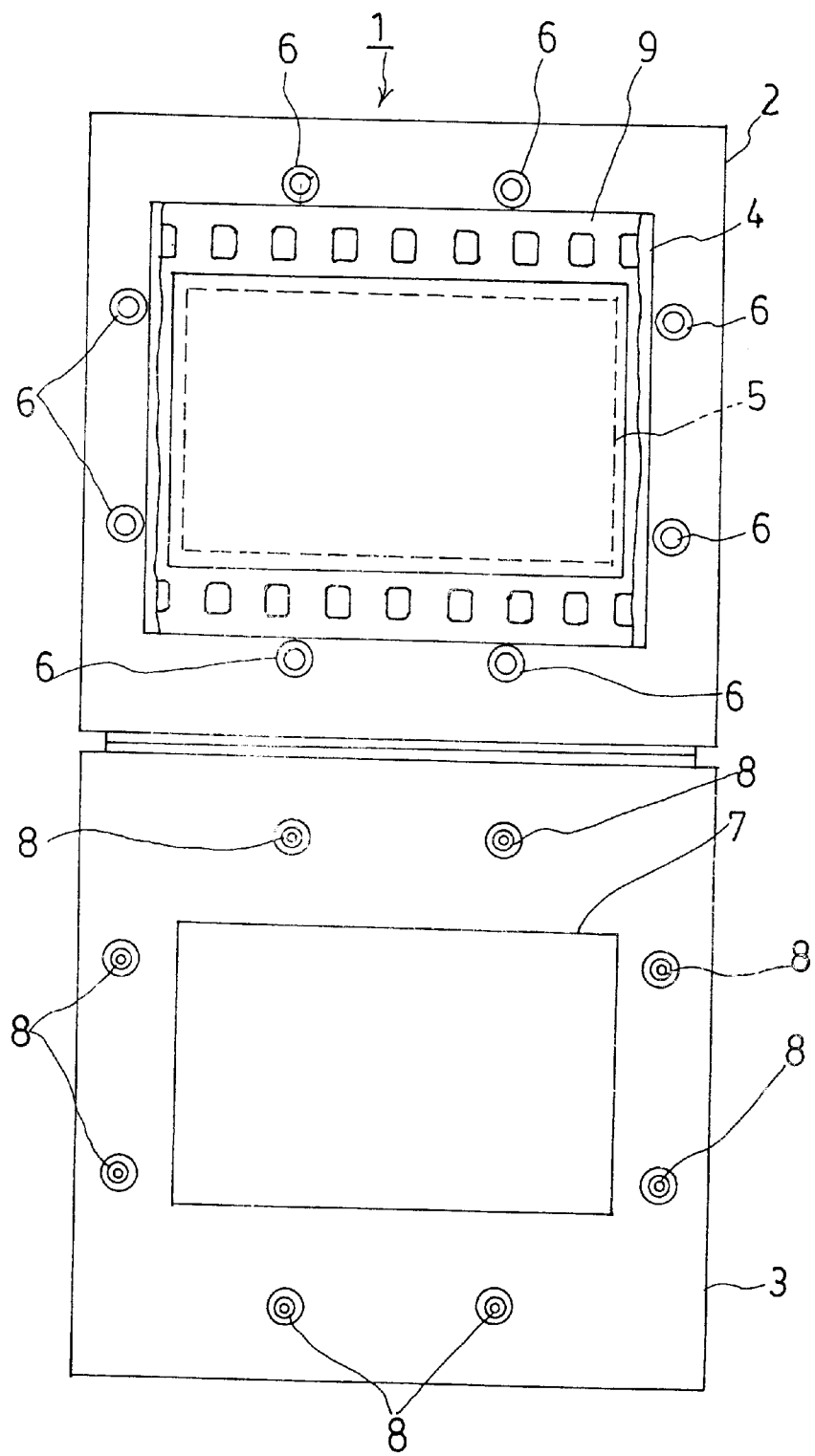
FIG. 6 is a plan view illustrating a prior art.

FIG. 5 illustrates a state in which the film 31 is fitted onto the slide mount 11. In the right-and-left direction, the film 31 has the engaging holes 32, at both ends thereof engaged with the positioning pins 15, and is anchored. In the up-and-down direction, the film 31 is anchored with its side portion being fitted to the step formed in the film-placing portion 14.

In this embodiment, though the positioning pins 15, were of a circular shape, the same effects can be exhibited even when the positioning pins 15, have a polygonal shape such as a triangular shape, a square shape or a like shape, without being limited to the circular shape. Furthermore, the positioning pins 15, may be folded after they have engaged with the film 31. In this case, the film 31 should be correctly positioned on the film-placing portion 14.

Moreover, since the windows 17, 18 formed in the slide mount 11 have a size larger than the size of the screen 23, the screen 23 of the film 31 is disposed on the inside of the windows 17 and 18.

Though the film 31 according to this embodiment possessed the width of 35 mm, the same effects can be exhibited by the films that have holes perforated in both side portions thereof in an opposing manner, and the width is in no way limited to 35 mm only.

The present invention can be modified in a variety of other ways without departing from the spirit and scope of the invention, and it should be noted that the present invention encompasses even those modified embodiments as a matter of course.

According to the invention as described in detail in the foregoing embodiment, the positioning holes formed in the cover are engaged with the positioning pins while the holes perforated in both side portions of the film in an opposing manner are engaged with the positioning pins of the mount, enabling the film to be easily fitted onto the slide mount. Moreover, since the holes that are highly accurately perforated in both side portions of the film are brought as engaging holes into engagement with the positioning pins of the mount, the film is correctly positioned on the slide mount.

According to the invention the window formed in the slide mount has a size larger than the size of the screen, the screen is never hindered by the window. Moreover, the unexposed portions of the film that are developed into black color can be used as a frame of the screen, exhibiting various effects such as vividly projecting the screen frame.

What is claimed is:

1. A slide mount assembly comprising:

a rectangular film portion having first opposing lateral edges, a partial gap portion at each of said first opposing lateral edge, and a rectangular photographed screen between the first opposing lateral edges, each of the partial gap portions having therein a pair of holes being cut nearly in half forming open engaging holes in the opposing lateral edges;

a mount having a first rectangular window therein, said first rectangular window having second opposing lateral edges;

four positioning pins only formed on said mount, one each of said four positioning pins positioned near each corner of the first rectangular window, said four position pins being positioned to receive the open engaging holes when said rectangular film portion is positioned within said mount;

a cover having a second rectangular window, said cover having four positioning holes formed therein, one of said positioning holes near each corner of the second rectangular window and adapted to be brought into engagement with said four positioning pins when said cover is closed over said mount, whereby said rectangular film portion is positioned securely in the slide mount when said cover is closed over said rectangular film portion having a convex portion causing said rectangular film to be extended forcing the open engaging holes against said four positioning pins and causing the photographed screen to be centered therein.

2. A slide mount assembly as in claim 1 wherein:

the first and second windows are larger than the rectangular photographed screen.

3. A slide mount assembly as in claim 1 wherein:

said four positioning pins are circular in shape.

4. A slide mount assembly as in claim 1 wherein:

said four positioning pins are located outside the second opposing lateral edges.

5. A method of mounting a slide film comprising the steps of:

cutting the slide film having gap portions and a plurality of holes in both side portions such that the holes are cut nearly into one-half forming open engaging hole portions;

inserting the slide film into a slide mount having positioning pins studded at four corners such that the open engaging hole portions are positioned to come into engagement with the positioning pins; and closing a cover contacting a convex portion of the slide film causing the slide film to be extended and forcing the open engaging holes into contact with the positioning pins studded at four corners, whereby the film is quickly and easily inserted into the slide mount and when the cover is closed the film is securely held.

* * * * *